UNITED STATES PATENT OFFICE.

RODMAN B. NEWPORT, OF PHILADELPHIA, PENNSYLVANIA.

METHOD OF TREATING GARBAGE.

SPECIFICATION forming part of Letters Patent No. 703,295, dated June 24, 1902.

Application filed March 20, 1902. Serial No. 99,207. (No specimens.)

*To all whom it may concern:*

Be it known that I, RODMAN B. NEWPORT, a citizen of the United States, residing in Philadelphia, Pennsylvania, have invented certain Improvements in Treating Garbage, of which the following is a specification.

The object of my invention is to manufacture by a simple and inexpensive process an available commercial fertilizer from ordinary domestic garbage—an object which I attain in the manner hereinafter set forth.

The garbage is first subjected to the action of a steam-digester in order to melt and free the grease contained in it, and after being thus treated is subjected to pressure in a hydraulic or other mechanical press in order to express the grease and other liquid matters therefrom so far as the same can be expressed by such pressure. The crude pressed garbage cake is then broken up and mixed in an ordinary fertilizer-mixer with commercial sulfuric acid and mineral or animal phosphate or both. For this purpose I may use ground phosphate rock, ground Belgian rock, basic slag, natural guanos, natural marls, and ground animal bone, either raw or steamed or in the form of bone-black, and the sulfuric acid may be new or "recovered" or "sludge" or a combination of same. This compound is thoroughly mixed for about three minutes and is then dumped into a receptacle ordinarily called a "hot-box," where it remains for about twenty-four hours, during which time the chemical and mechanical action of the acid entirely disintegrates the solid matter of the garbage and at the same time makes available both the ammonia and phosphoric acid contained therein.

"Hot-box" is a term ordinarily used in phosphate manufacture, and is not intended to mean a box or receptacle externally or otherwise artificially heated.

My invention overcomes the objections to the present method of reducing garbage by means of steam-driers, as such method is unsatisfactory, first, because of the expensiveness of the process, the method requiring the employment of cumbersome machinery, which entails the use of large volumes of steam; secondly, because the product after it has been so dried is not in condition for use in an ordinary fertilizer-drill, owing to being "fluffy;" thirdly, because the ammonia is left in an unavailable form, and, fourthly, because a portion of the ammonia is driven off during the drying process. For these reasons the destructive process of cremation has largely been adopted in the disposal of garbage and the valuable fertilizing ingredients of the garbage have gone to waste.

By my improved process the ammonia is recovered and fixed and the phosphate of lime is converted into sulfate of lime and available phosphoric acid, the resultant product containing ammonia, phosphoric acid, and potash, which is a complete fertilizer.

The action of the sulfuric acid upon the garbage is both mechanical and chemical, but is largely mechanical, the solid matter being disintegrated by reason of the heat created by the chemical combination of the acid with the phosphate of lime contained in the phosphates, and a fivefold purpose is accomplished, as follows: The ammonia and phosphoric acid are reduced to an available form for plant-food, the escape of ammonia, which is the most valuable component part of the garbage, is prevented, the garbage is quickly reduced, the cost of manufacture is minimized, and a large percentage of the moisture in the garbage is driven off, which causes the resultant compound to be in excellent condition for use in a fertilizer-drill without further drying, and hence without further expenditure of either time or money.

The portions of garbage, phosphate, and sulfuric acid employed in carrying out my invention may vary, depending upon the desired percentage of the various ingredients in the finished product. Good results may be obtained, however, by using about six hundred pounds pressed garbage, seven hundred pounds sulfuric acid, and six hundred pounds phosphate.

The analysis of the crude pressed garbage as it comes from the presses is about as follows: thirty to sixty per cent. moisture, two to four per cent. ammonia, .10 to .50 per cent. actual potash, six to twelve per cent. bone phosphate of lime.

The analysis of the finished product is approximately ten to twenty per cent. moisture, one to three per cent. ammonia, .20 to .50 per cent. actual potash, ten to twenty per cent. available phosphoric acid.

I am aware that it has been quite common in the manufacture of fertilizers to subject nitrogenous matters and phosphates to the action of sulfuric acid, and therefore I do not claim such process; but

I claim and desire to secure by Letters Patent—

The mode herein described of treating garbage, said mode consisting in first digesting the same to melt and free the grease, then expressing grease and other liquid matters therefrom, and then mixing the pressed mass with phosphates and sulfuric acid, in quantities sufficient to decompose the solid matters by the heat developed by the reaction, and in the absence of externally-applied heat, substantially as specified.

In testimony whereof I have signed my name to this specification in the presence of two subscribing witnesses.

RODMAN B. NEWPORT.

Witnesses:
F. E. BECHTOLD,
JOS. H. KLEIN.